(12) United States Patent
Ichihashi et al.

(10) Patent No.: US 9,389,430 B2
(45) Date of Patent: Jul. 12, 2016

(54) LIGHT DEFLECTION ELEMENT AND IMAGE DISPLAY APPARATUS USING THE SAME

(71) Applicant: Panasonic Intellectual Property Management Co., Ltd., Osaka (JP)

(72) Inventors: Kouki Ichihashi, Osaka (JP); Masahiro Kasano, Osaka (JP); Yasuhiro Tanaka, Hyogo (JP); Katsuhiko Hayashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/517,049

(22) Filed: Oct. 17, 2014

(65) Prior Publication Data

US 2015/0036209 A1 Feb. 5, 2015

Related U.S. Application Data

(63) Continuation of application No. PCT/JP2013/002807, filed on Apr. 25, 2013.

(30) Foreign Application Priority Data

Apr. 26, 2012 (JP) ................................. 2012-101114

(51) Int. Cl.
*G02F 1/29* (2006.01)
*G02B 27/22* (2006.01)
(Continued)

(52) U.S. Cl.
CPC ........ *G02B 27/2264* (2013.01); *G02B 27/0093* (2013.01); *G02B 27/2214* (2013.01); *G02B27/26* (2013.01); *G02F 1/133526* (2013.01); *G02F 1/29* (2013.01); *G02B 3/005* (2013.01); *G02F 2001/133565* (2013.01); *G02F 2001/291* (2013.01)

(58) Field of Classification Search
CPC ........... G02B 27/0093; G02B 27/2214; G02B 27/2264; G02B 27/26; G02B 3/005; G02F 1/133526; G02F 1/29; G02F 2001/133565; G02F 2001/291

USPC .................................................. 359/315–320
See application file for complete search history.

(56) References Cited

U.S. PATENT DOCUMENTS 5,930,044 A * 7/1999 Schleipen ............. G02F 1/1335
349/201
2005/0276071 A1 12/2005 Sasagawa et al.
(Continued)

FOREIGN PATENT DOCUMENTS

JP    2000-507005    6/2000
JP    2007-179059    7/2007
(Continued)

OTHER PUBLICATIONS

International Search Report issued Aug. 6, 2013 in International (PCT) Application No. PCT/JP2013/002807.

*Primary Examiner* — Scott J Sugarman
*Assistant Examiner* — Vipin Patel
(74) *Attorney, Agent, or Firm* — Wenderoth, Lind & Ponack, L.L.P.

(57) ABSTRACT

A light deflection element is capable of deflecting incident light so as to follow a position of an observer and suppressing reduction in intensity of light that reaches eyes of the observer regardless of their position. The light deflection element includes: a first optical element configured to deflect incident light; a second optical element configured to change a deflection direction of emitted light by changing a refractive index thereof according to a voltage applied thereto; a third optical element; and a control section configured to control the voltage applied to the second optical element. At least one of interfaces between the first and second optical elements and the second and third optical elements is an aspheric surface. The aspheric surface has an optical power that compensates enlargement of the emitted light which is caused by refractive index distribution caused when a voltage is applied to the second optical element.

1 Claim, 11 Drawing Sheets

(51) Int. Cl.
*G02B 27/26* (2006.01)
*G02B 27/00* (2006.01)
*G02F 1/1335* (2006.01)
*G02B 3/00* (2006.01)

(56) References Cited

U.S. PATENT DOCUMENTS

2009/0052164 A1 2/2009 Kashiwagi et al.
2009/0316274 A1* 12/2009 Lee .................. G02B 5/045
                                              359/634

2010/0157026 A1 6/2010 Reichelt

FOREIGN PATENT DOCUMENTS

| | | |
|---|---|---|
| JP | 2009-037079 | 2/2009 |
| JP | 2009-53345 | 3/2009 |
| JP | 2010-529485 | 8/2010 |
| JP | 2010-282214 | 12/2010 |
| JP | 2011-014442 | 1/2011 |
| JP | 2011-118168 | 6/2011 |

* cited by examiner

LIGHT DEFLECTION ELEMENT AND IMAGE DISPLAY APPARATUS USING THE SAME

CROSS-REFERENCE TO RELATED APPLICATION

This application is a Continuation of International Application No. PCT/JP2013/002807, filed on Apr. 25, 2013, which claims priority of Japanese Application No. 2012-101114, filed on Apr. 26, 2012, the disclosures of which applications are incorporated by reference herein.

BACKGROUND

1. Field

The present disclosure relates to a light deflection element that deflects incident light, and an image display apparatus using the light deflection element.

2. Description of the Related Art

Japanese Laid-Open Patent Publication (translation of PCT application) No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication No. 2010-529485, optical refraction behavior by deflection means is changed so as to follow a shift of the eye position of each observer. The deflection means is composed of electrowetting cells containing two types of immiscible liquids. When a voltage is applied to the electrowetting cells, the interface between the liquids is changed, whereby a prism function is realized by the electrowetting cells.

SUMMARY

The present disclosure provides a light deflection element capable of deflecting incident light so as to follow the position of an observer and suppressing reduction in the intensity of light reaching the eyes of the observer regardless of the position of the observer, and an image display apparatus using the light deflection element.

The light deflection element according to the present disclosure includes: a first optical element configured to deflect incident light; a second optical element configured to change a deflection direction of emitted light by changing a refractive index thereof according to a voltage applied thereto; a third optical element disposed on an exit side of the second optical element; and a control section configured to control the voltage applied to the second optical element. At least one of an interface between the first optical element and the second optical element and an interface between the second optical element and the third optical element is an aspheric surface. The aspheric surface has an optical power that compensates enlargement of the emitted light which is caused by refractive index distribution caused when a voltage is applied to the second optical element.

The present disclosure is effective in realizing a light deflection element capable of deflecting incident light so as to follow the position of an observer and suppressing reduction in the intensity of light reaching the eyes of the observer regardless of the position of the observer; and an image display apparatus using the light deflection element.

DETAILED DESCRIPTION

Hereinafter, embodiments of the present disclosure will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art.

It is noted that the inventors provide the accompanying drawings and the following description in order that a person skilled in the art may fully understand the present disclosure, and do not intend to limit the subject matter defined by the claims.

<1. Configuration of Image Display Apparatus>

Figure 1:
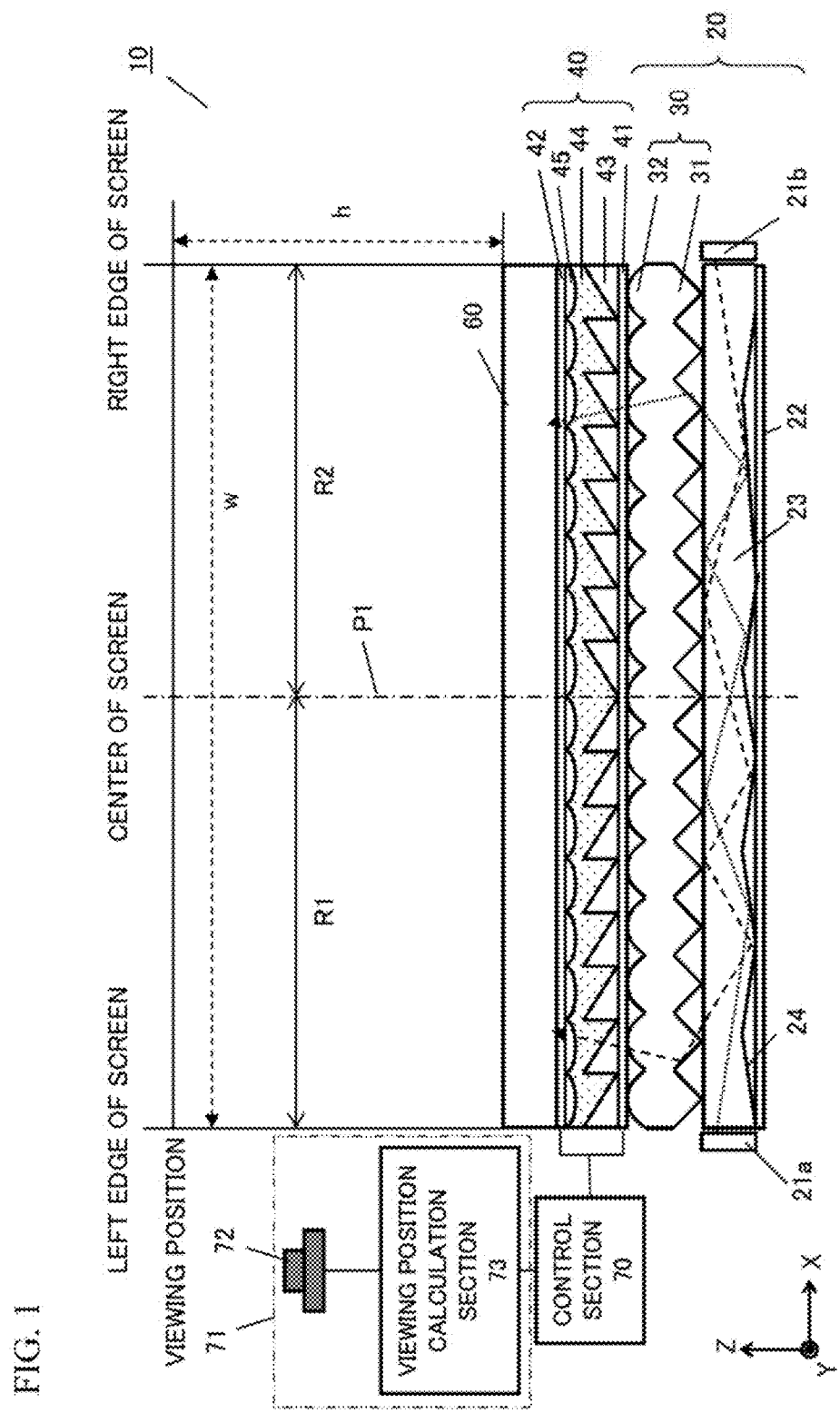
FIG. 1 is a schematic configuration diagram showing an image display apparatus according to an embodiment.
Figure 2:
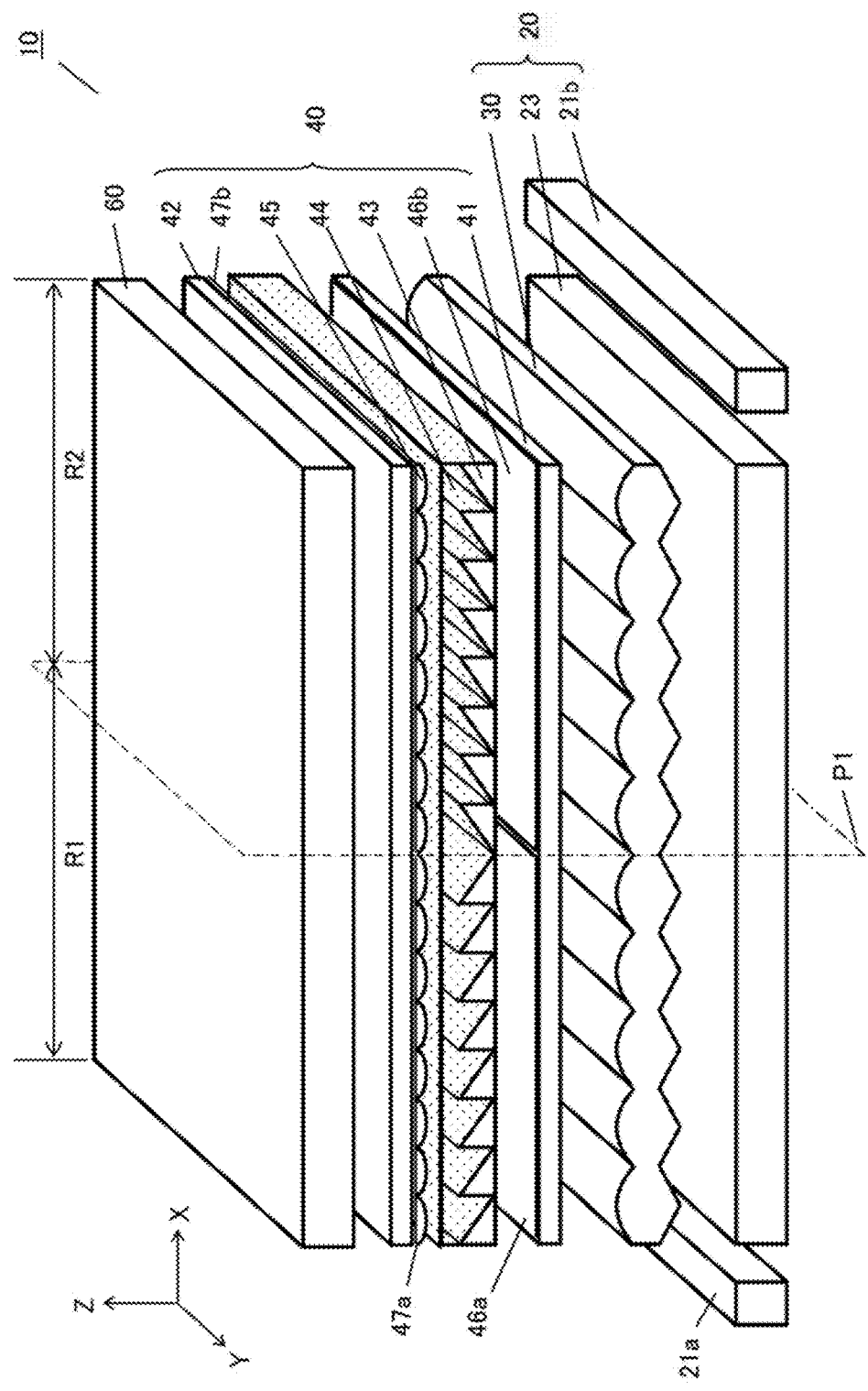
FIG. 2 is an exploded perspective view of a part of the image display apparatus according to the embodiment.

FIG. 1 is a schematic cross-sectional view of an image display apparatus 10 according to the embodiment, and FIG. 2 is an exploded perspective view of a part of the image display apparatus 10 shown in FIG. 1. In FIG. 1, illustration of electrodes 46a, 46b, 47a, and 47b shown in FIG. 2 is omitted.

In the present embodiment, a three-dimensional orthogonal coordinate system is set for the image display apparatus 10, and a direction is specified by using coordinate axes. As shown in FIGS. 1 and 2, an X axis direction coincides with a right-left direction (horizontal direction) when an observer faces a display surface of an image display panel 60. A Y axis direction coincides with an up-down direction when the observer faces the display surface of the image display panel 60. A Z axis direction coincides with a direction perpendicular to the display surface of the image display panel 60. Here, "facing" means that the observer is present directly in front of the display surface such that, for example, when a letter of "A" is displayed on the display surface, the observer sees the letter of "A" from a correct direction. In addition, FIGS. 1 and 2 correspond to views as seen from above the image display apparatus 10. Thus, the left side in FIGS. 1 and 2 corresponds to the right side of the display screen when an observer sees the display screen.

The image display apparatus 10 includes a light source switching type backlight 20 (an example of a backlight device), a liquid crystal prism element 40, the image display panel 60 that displays an image for right eye and an image for left eye while alternately switching between the image for right eye and the image for left eye, a position detection section 71 that detects the position of an observer who uses the image display apparatus 10, and a control section 70 that controls a liquid crystal driving voltage outputted to a liquid crystal prism element 40 on the basis of information of the detected position of the observer. Hereinafter, each component will be described in detail.

The backlight 20 includes light sources 21a and 21b facing each other, a reflection film 22, a light guide plate 23, and a light control film 30. The reflection film 22 is provided on a lower surface side of the light guide plate 23, and the light control film 30 is provided on an upper surface side (front surface side) of the light guide plate 23.

The light sources 21a and 21b are arranged so as to extend along a pair of side surfaces, respectively, of the light guide plate 23, and face each other in the X axis direction. The light source 21a is located at the left side surface of the light guide plate 23, and the light source 21b is located at the right side surface of the light guide plate 23. Each of the light sources 21a and 21b has a plurality of LED elements arranged in the Y axis direction. Each of the light sources 21a and 21b alternately repeats lighting-up and going-out in synchronization with switching between the image for right eye and the eye image for left eye that are displayed on the image display panel 60. In other words, when the image display panel 60 displays the image for right eye, the light source 21a lights up and the light source 21b goes out, and when the image display panel 60 displays the image for left eye, the light source 21a goes out and the light source 21b lights up.

Light emitted from the light sources 21a and 21b spreads in the light guide plate 23 while being repeatedly totally reflected at the upper surface and the lower surface of the light guide plate 23. Light having an angle exceeding the total reflection angle within the light guide plate 23 is emitted from the upper surface of the light guide plate 23. The lower surface of the light guide plate 23 is composed of a plurality of inclined surfaces 24 as shown in FIG. 1. By these inclined surfaces 24, light propagating in the light guide plate 23 is reflected in various directions, and thus the intensity of the light emitted from the light guide plate 23 becomes uniform across the entire upper surface.

The reflection film 22 is provided on the lower surface side of the light guide plate 23. Light having an angle exceeding the total reflection angles of the inclined surfaces 24 provided in the lower surface of the light guide plate 23 is reflected by the reflection film 22, enters the light guide plate 23 again, and is eventually emitted from the upper surface. The light emitted from the light guide plate 23 is incident on the light control film 30.

On a lower surface of the light control film 30, a plurality of prisms 31 each having a triangular cross section and a ridge line extending in the Y axis direction are aligned along the X axis direction. In other words, on the lower surface of the light control film 30, the prisms 31 each having a triangular cross section are arranged in a one-dimensional array. In addition, on an upper surface of the light control film 30, a plurality of cylindrical lenses 32 extending in the Y axis direction are aligned along the X axis direction. In other words, a lenticular lens is formed on the upper surface of the light control film 30.

The light incident on the lower surface of the light control film 30 is refracted toward the Z axis direction by the prisms 31, converged by the cylindrical lenses 32 located on the upper surface, and is incident on the liquid crystal prism element 40.

Figure 3:
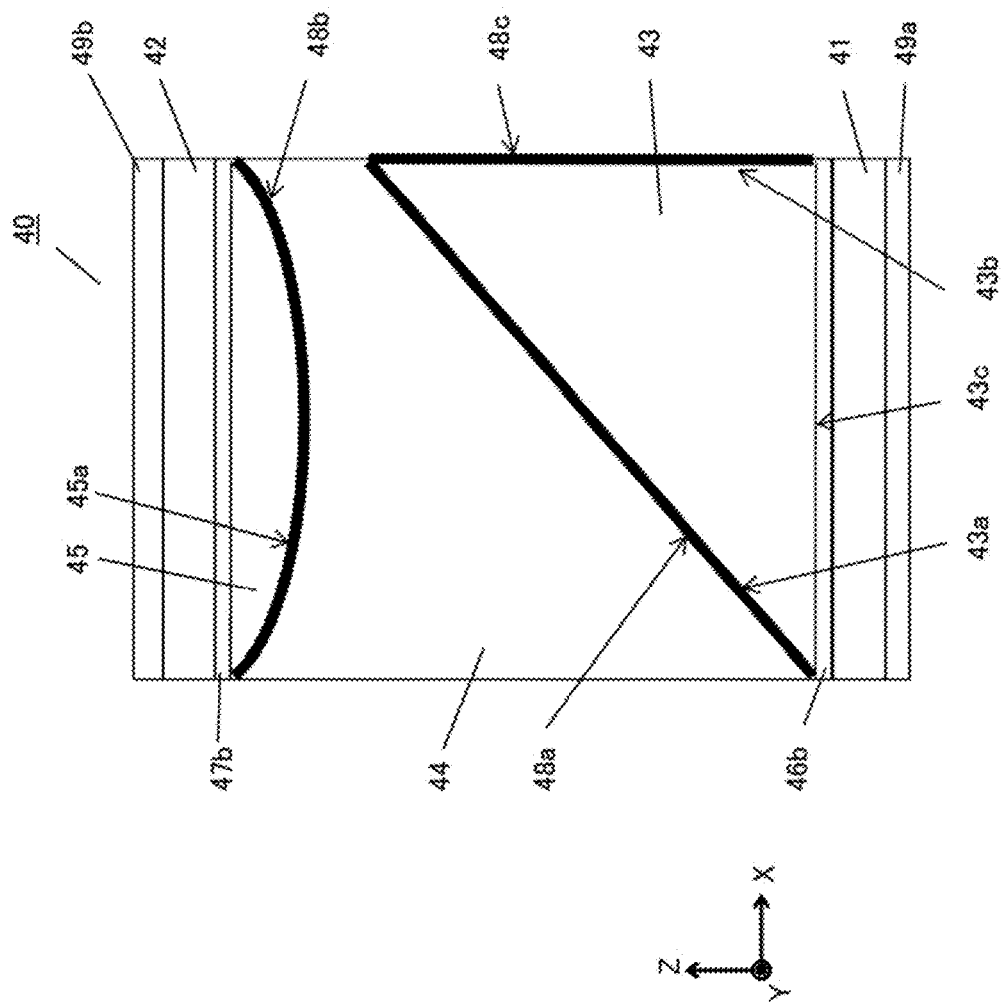
FIG. 3 is a partially enlarged view of a liquid crystal prism element according to the embodiment.

FIG. 3 is a partially enlarged view of the liquid crystal prism element 40 according to the embodiment shown in FIG. 1. Specifically, FIG. 3 is an enlarged view of a part of a right-side area of the liquid crystal prism element 40 shown in FIG. 1.

Hereinafter, the liquid crystal prism element 40 will be described in detail with reference to FIGS. 1 to 3 in combination.

The liquid crystal prism element 40 controls the deflection direction such that light which has been emitted from the left-side light source 21a and entered the prism element 40 via the light guide plate 23 and the light control film 30 is converged to the position of the right eye of the observer. Alternatively, the liquid crystal prism element 40 controls the deflection direction such that light which has been emitted from the right-side light source 21b and entered the prism element 40 via the light guide plate 23 and the light control film 30 is converged to the position of the left eye of the observer.

The liquid crystal prism element 40 is composed of prisms 43 constituting a first optical element, a liquid crystal layer 44 constituting a second optical element, and lenses 45 constituting a third optical element.

More specifically, the liquid crystal prism element 40 includes a pair of opposing substrates 41 and 42, a plurality of prisms 43 (an example of the first optical element) and a liquid crystal layer 44 (an example of the second optical element) sealed between the opposing substrates 41 and 42, electrodes 46a and 46b (an example of a first electrode) provided on an inner surface of the opposing substrate 41, electrodes 47a and 47b (an example of a second electrode) provided on an inner surface of the opposing substrate 42, lenses 45 (an example of the third optical element) provided between the electrodes 47a and 47b, and the liquid crystal layer 44, an alignment film 48a provided on inclined surfaces of the prisms 43, and an alignment film 48b provided between the lenses 45 and the liquid crystal layer 44. A light incident surface 45a of each of the lenses 45 is an aspheric surface having an optical power in the X axis direction. In addition, polarizers 49a and 49b for causing polarization directions of incident light and emitted light to be identical are provided on outer surfaces of the opposing substrates 41 and 42, respectively. In the present embodiment, the transmission axes of the polarizers 49a and 49b extend in the Y axis direction. In other words, light of components in polarization directions other than the Y axis direction is absorbed.

Each of the prisms 43 is formed in a triangular pole shape having a triangular cross section and a ridge line extending in the Y axis direction. Each prism 43 has an inclined surface 43a facing the center of the screen, wall surfaces 43b facing the both ends of the screen, and a bottom surface 43c.

As shown in FIG. 2, the plurality of prisms 43 are provided on the inner surfaces of the electrodes 46a and 46b so as to be aligned along the X axis direction. The plurality of lenses 45 are provided on the inner surfaces of the electrodes 47a and 47b so as to be aligned along the X axis direction. The cross-sectional shapes of the plurality of prisms 43 and the plurality of lenses 45 are bilaterally symmetrical in the entire liquid crystal prism element 40. For facilitating the explanation, the region where the prisms 43 are formed is divided into left and right halves shown in FIGS. 1 and 2. The left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 60 is indicated by P1. The cross-sectional shapes of the prisms 43 and the lenses 45 located in the region R1 and the cross-sectional shapes of the prisms 43 and the lenses 45 located in the region R2 are designed so as to be symmetrical to each other about the plane P1 when seen on a plane parallel to an XZ plane, as shown in FIGS. 1 and 2.

The electrode 46a is formed in the region R1 of the inner surface of the opposing substrate 41, and the electrode 46b is formed in the region R2 of the inner surface of the opposing substrate 13. Likewise, the electrode 47a is formed in the region R1 of the inner surface of the opposing substrate 42, and the electrode 47b is formed in the region R2 of the inner surface of the opposing substrate 42.

Further, the alignment films 48a and 48b that are subjected to orientation treatment for controlling the orientation directions of liquid crystal molecules into a desired direction are provided on the surfaces, contacting the liquid crystal layer 44, of the prisms 43 and the lenses 45. The alignment films 48a and 48b orient the liquid crystal molecules such that the long axes of the liquid crystal molecules extend in the Y axis direction in a state where no voltage is applied to the electrodes 46a and 46b and the electrodes 47a and 47b. The alignment films 48a and 48b may be omitted if the orientation of the liquid crystal molecules can be kept uniform.

As materials of the opposing substrates 41 and 42, the prisms 43, and the lenses 45, glass or resin may be used. When resin is used as a material of the prisms 43 and the lenses 45, the prisms 43 and the lenses 45 can be formed by, for example, imprinting a UV-curing resin on a glass substrate. The liquid crystal prism element 40 can be fabricated by forming a one-dimensional array of the prisms 43 on the opposing substrate 41 on which the electrodes 46a and 46b have been formed, and forming a one-dimensional array of the lenses 45 on the opposing substrate 42 on which the electrodes 47a and 47b have been formed, and then bonding the opposing substrates 41 and 42 to each other, and finally injecting a liquid crystal between the opposing substrates 41 and 42.

The liquid crystal prism element 40 is an element that can control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 44 has a birefringence property in which a refractive index is different for each polarization direction of incident light. In addition, when the direction of the longitudinal axis orientation (director) of each liquid crystal molecule changes with respect to the polarization direction of light, the refractive index of the liquid crystal layer 44 also changes. Thus, when the orientation of the liquid crystal is changed by an electric field generated by applying a certain voltage, the refractive index for transmitted light changes, and thus a deflection angle which is a refraction angle of the light changes.

In the present embodiment, a case where uniaxial positive type liquid crystal is used as the material forming the liquid crystal layer 44 will be considered. Then, a case where the longitudinal axes of the liquid crystal molecules are oriented in the Y axis direction when no voltage is applied between the opposing substrates, and the longitudinal axes of the liquid crystal molecules are oriented in the Z axis direction when a voltage is applied between the substrates will be considered.

Since the transmission axes of the polarizers 49a and 49b extend in the Y axis direction, the refractive index of the liquid crystal layer 44 when no voltage is applied is an extraordinary light refractive index, and the refractive index of the liquid crystal layer 44 when a voltage is applied is an ordinary light refractive index.

In general, in the case where light is deflected by an active element such as the liquid crystal prism element 40, it is desirable to use a liquid crystal material having high $\Delta n$ (=refractive index ne for extraordinary light−refractive index no for ordinary light), in order to increase a deflection angle. However, among commercially available materials, the number of liquid crystal materials having high $\Delta n$ is small, and $\Delta n$ is generally about 0.2.

In addition, even when the liquid crystal prism element 40 is formed using the same liquid crystal material, design of the orientation direction and a manner of applying an electric field are essential items that have a great influence on the element performance, which is the ability of the liquid crystal prism element 40, such as a deflection angle, electric power, a switching speed or the like.

In the liquid crystal prism element 40, the inclination direction of each inclined surface of each prism 43 is different between the right and left sides of the center line of the screen (the plane P1). The liquid crystal prism element 40 has a property in which the efficiency of deflection toward a direction (upper-right direction in FIG. 3) in which the emitted light gets close to the inclined surface of each prism 43 is lower than the efficiency of deflection in a direction (upper-left direction in FIG. 3) in which the emitted light becomes more distant from the inclined surface of each prism 43. Thus, when the inclined surfaces of the prisms 43 are made symmetrical about the plane P1 and are also made to face ahead of the center portion of the screen, the liquid crystal prism element 40 is able to efficiently deflect light incident near the left edge of the screen, toward ahead of the screen on the right, and is able to efficiently deflect light incident near the right edge of the screen, toward ahead of the screen on the left. In this case, different voltages are applied to the left and right regions of the liquid crystal prism element 40. Thus, the electrodes 46a and 46b and the electrodes 47a and 47b are respectively separated at the center of the screen. When two electrodes in the same substrate are used as ground terminals, the electrodes need not be separated at the center.

Light transmitted through the liquid crystal prism element 40 is incident on the image display panel 60. One example of the image display panel 60 is an in-plane-switching type panel. However, another type of image display panel can be used as the image display panel 60. Light transmitted through the image display panel 60 has directivity and is converged at the position of an eye of the observer.

The image display apparatus 10 switches between the light sources 21a and 21b in synchronization with switching between the image for right eye and the image for left eye. In addition, when the switching between the image for right eye and the image for left eye is performed at a frequency equal to or higher than 120 Hz, the observer can recognize a stereoscopic image on the basis of the image for right eye and the image for left eye.

The position detection section 71 includes a camera 72 and a viewing position calculation section 73. The camera 72 takes an image of the observer in predetermined cycles. The viewing position calculation section 73 analyzes the image taken by the camera 72, and calculates viewing position information representing a viewing position of the observer. For the image analysis performed by the camera 72, a known algorithm for recognizing the position of a face or a portion (eyes, nose, etc.) of a face can be used. In addition, the viewing position information calculated by the viewing position calculation section 73 preferably represents the positions of the eyes of the observer, but may represent the position of the face, the nose, or the like instead of the positions of the eyes.

The control section 70 controls the value of a voltage applied to the liquid crystal prism element 40, on the basis of the viewing position information calculated by the viewing position calculation section 73. More specifically, when the viewing position of the observer shifts from a position in front of the screen center to the left edge side, the light emitted from each prism 43 is deflected in the right direction as seen from the observer by making the refractive index of the liquid crystal layer 44 lower than the refractive index of each prism 43 in the region R1 and making the refractive index of the liquid crystal layer 44 higher than the refractive index of each prism 43 in the region R2. At that time, the voltage applied to the region R1 is made higher and the voltage applied to the region R2 is made lower than a voltage applied when light is not deflected, thereby adjusting the deflection angle of the region R1 and the deflection angle of the region R2. In contrast, when the viewing position of the observer shifts from a position in front of the screen center to the right edge side, the light emitted from each prism 43 is deflected in the left direction as seen from the observer by making the refractive index of the liquid crystal layer 44 higher than the refractive index of each prism 43 in the region R1 and making the refractive index of the liquid crystal layer 44 lower than the refractive index of each prism 43 in the region R2. At that time, the voltage applied to the region R2 is made higher and the voltage applied to the region R1 is made lower than the voltage applied when light is not deflected, thereby adjusting the deflection angle of the region R1 and the deflection angle of the region R2.

The deflection angle of the liquid crystal prism element 40 with respect to the applied voltage and position information of a converged point of light can be assumed at the stage of designing, and thus it suffices to previously prepare data that associates an applied voltage with position information and to store the data in a storage unit provided in the image display apparatus 10. In addition, after completion of a product, calibration may be performed to correct the position of a light converged point.

By repeating the above-described deflection control based on the viewing position information in predetermined cycles, it is made possible for the observer to view a stereoscopic image at an arbitrary location even when the observer freely moves relative to the image display apparatus 10. Thus, according to the liquid crystal prism element 40 of the present disclosure, an image display apparatus 10 having a wide view range can be realized. In addition, by converging light at the position of an eye of the observer, a high-brightness and energy-saving image display apparatus 10 can be realized.

In the present embodiment, the light guide plate 23 is shared by the light sources 21a and 21b. However, a light guide plate for the light source 21a and a light guide plate for the light source 21b may be provided so as to be laminated on each other.

In addition, instead of the control film 30 in which the prisms and the lenticular lens are integrated, a prism sheet and a lenticular lens sheet may be individually provided.

Furthermore, the backlight 20 is not limited to have the configuration shown in FIGS. 1 and 2, and may have another configuration as long as it is able to alternately emit light for right eye and light for left eye in a time division manner in synchronization with switching between right and left image signals.

Furthermore, in the present embodiment, the directions of the inclined surfaces of the prisms 43 in the liquid crystal prism element 40 are made different between the regions R1 and R2, and the inclined surfaces of the prisms 43 are formed so as to be symmetrical about the plane P1. However, the directions of the inclined surfaces of the prisms may be uniform in the entire liquid crystal prism element 40. In this case, instead of providing the separate electrodes in the regions R1 and R2 of the liquid crystal prism element 40 as in the present embodiment, a single electrode is provided over the entire display screen. However, it is more preferred to provide the prisms 43 and the electrodes separately in the two regions R1 and R2, in terms of the deflection angle and transmission efficiency of a light beam with respect to orientation change.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 21a and 21b are constantly lit up instead of being alternately lit up. As well as in the case of displaying a three-dimensional image, also when a two-dimensional image is displayed, the displayed content can be prevented from being seen by surrounding people and thus privacy protection can also be improved, in addition to energy saving, by following movement of the observer and projecting an image only on the eyes of the observer and the vicinity thereof in a reduced range.

<2. Description of Liquid Crystal Prism Element>

Figure 8:
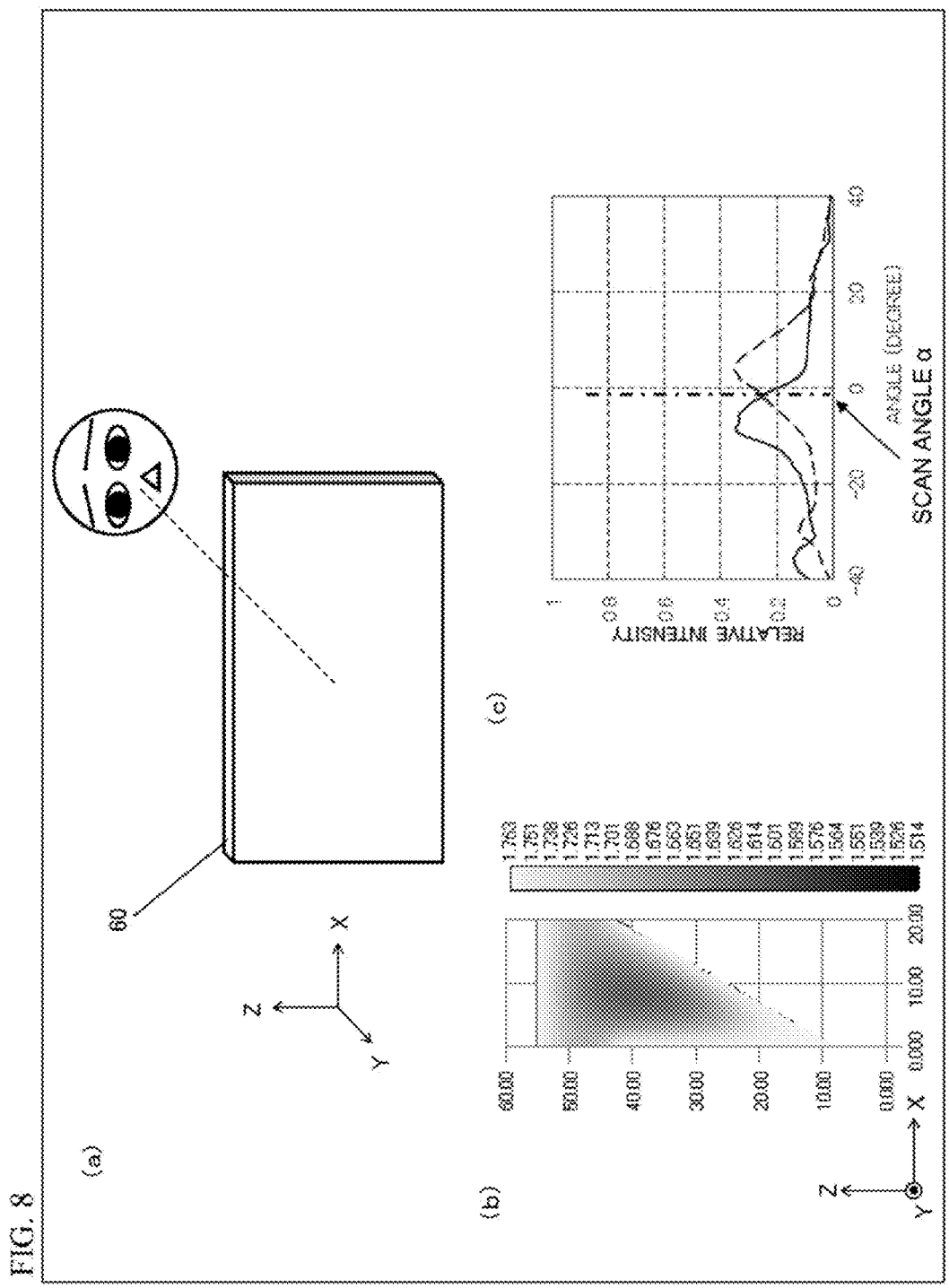
FIG. 8(a) is a schematic diagram showing a state where an observer is present at a position in front of the center of the image display apparatus.
FIG. 8(b) is a diagram showing refractive index distribution of the liquid crystal prism element according to the comparative example.
FIG. 8(c) is a graph showing the intensity of light emitted from the liquid crystal prism element according to the comparative example.
Figure 9:
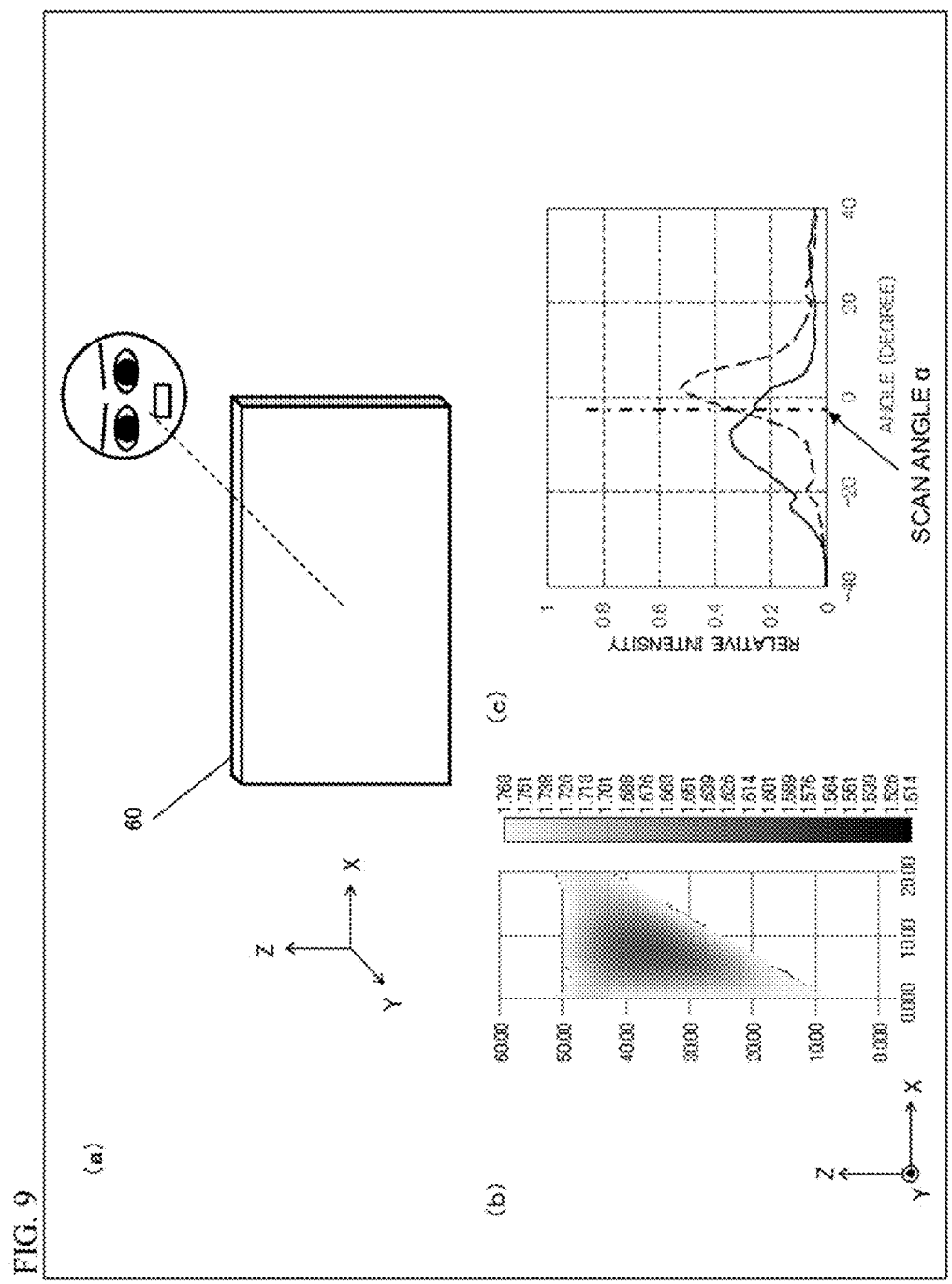
FIG. 9(a) is a schematic diagram showing a state where an observer is present at a position in front of the center of the image display apparatus.
FIG. 9(b) is a diagram showing refractive index distribution of the liquid crystal prism element according to an example.
FIG. 9(c) is a graph showing the intensity of light emitted from the liquid crystal prism element according to the example.

Hereinafter, the liquid crystal prism element 40 according to the present embodiment will be described with reference to FIGS. 3 and 9. In addition, a comparative example will be described with reference to FIGS. 5 to 8.

Here, three viewing positions of an observer, namely, the center, the left edge, and the right edge of the image display apparatus 10, are assumed. The "position at the center of the image display apparatus 10" means that the observer is present at a position in front of the center of the screen of the image display apparatus 10. The "position at the left edge of the image display apparatus 10" means that the observer is present at a position in front of the left edge of the screen of the image display apparatus 10, that is, in front of the right edge of the image display apparatus 10 as seen from the observer. The "position at the right edge of the image display apparatus 10" means that the observer is present at a position in front of the right edge of the screen of the image display apparatus 10, that is, in front of the left edge of the image display apparatus 10 as seen from the observer.

Figure 6:
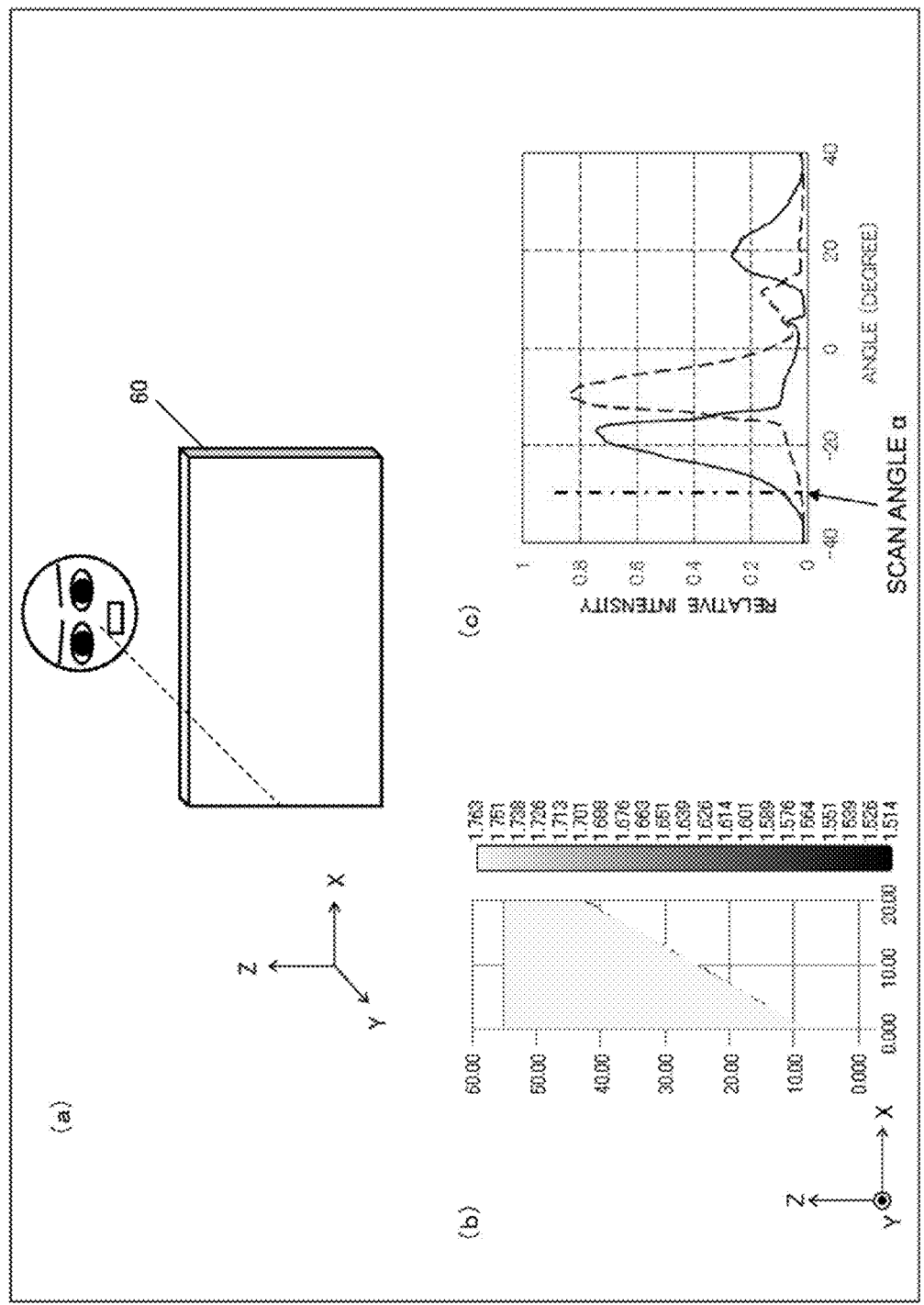
FIG. 6(a) is a schematic diagram showing a state where an observer is present at a position in front of a left edge of the image display apparatus.
FIG. 6(b) is a diagram showing refractive index distribution of the liquid crystal prism element according to the comparative example.
FIG. 6(c) is a graph showing the intensity of light emitted from the liquid crystal prism element according to the comparative example.
Figure 7:
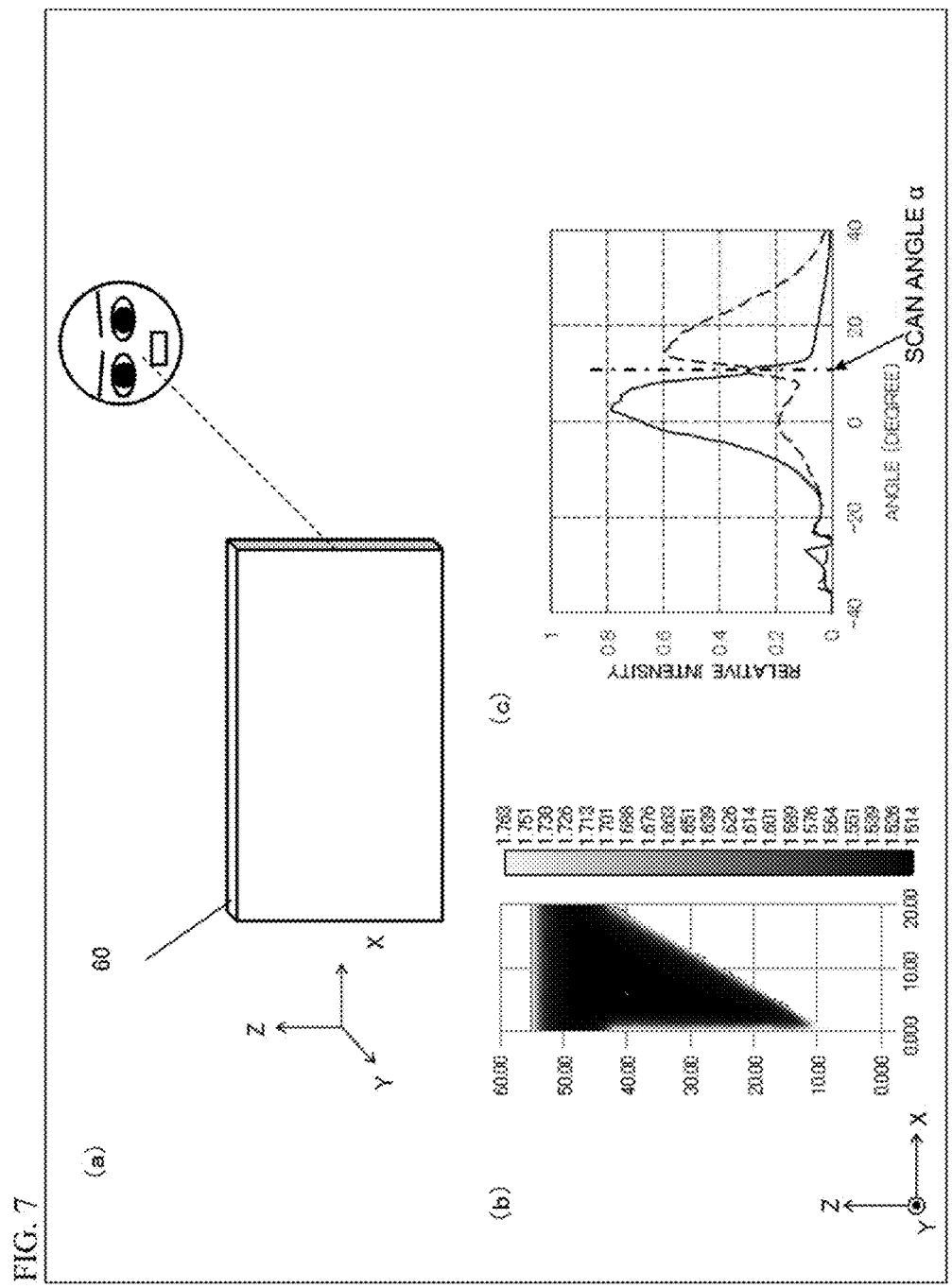
FIG. 7(a) is a schematic diagram showing a state where an observer is present at a position in front of a right edge of the image display apparatus.
FIG. 7(b) is a diagram showing refractive index distribution of the liquid crystal prism element according to the comparative example.
FIG. 7(c) is a graph showing the intensity of light emitted from the liquid crystal prism element according to the comparative example.

Although described in detail later, when the observer views the displayed image at the positions in front of the left edge and the right edge of the image display apparatus as shown in FIGS. 6 and 7, even the liquid crystal prism element 40 of the comparative example can realize desired brightness. In other words, when the observer views the displayed image at the positions in front of the left edge and the right edge of the image display apparatus, the observer is not very much concerned with reduction in the brightness of the displayed image. However, in the liquid crystal prism element of the comparative example, as shown in FIG. 8, when the observer is present at a position in front of the center of the screen, the intensity of light incident on the eyes of the observer is reduced. In order to resolve such a problem, the lenses 45 are used in the liquid crystal prism element 40 of the present embodiment. This configuration can suppress reduction in the intensity of light in the center of the screen. Hereinafter, the detail thereof will be described.

Prior to description of the optimum design of the liquid crystal prism element 40 of the present embodiment, the configuration of the liquid crystal prism element 40 according to the comparative example will be described. As setting conditions in the following description, a vertical distance (h in FIG. 1) between an observer and the image display apparatus is set to 300 mm, the width (w in FIG. 1) of the image display panel 60 is set to 221 mm, the extraordinary light refractive index ne of the liquid crystal material is set to 1.763, the ordinary light refractive index no of the liquid crystal material is set to 1.514 (Δn=0.25), and the refractive index n of each prism is set to 1.61. The repetition interval of the prisms is set to 20 μm, the prism angle (base angle) is set to 60°, and the cell gap of the liquid crystal prism (a distance between the electrode 46b and the electrode 47b) is set to 50 μm.

Comparative Example

Figure 4:
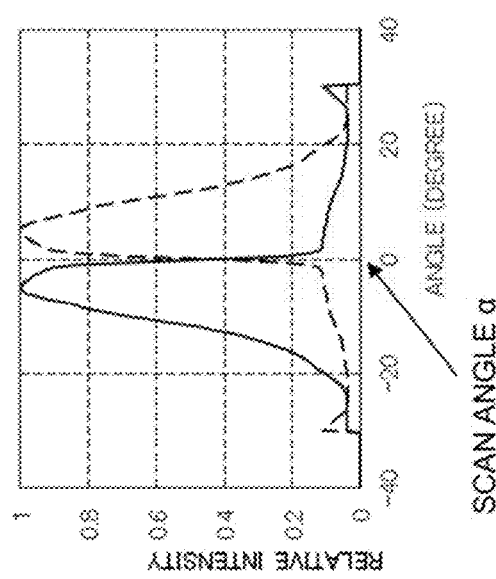
FIG. 4 is a graph showing the intensity of light incident on the liquid crystal prism element.
Figure 5:
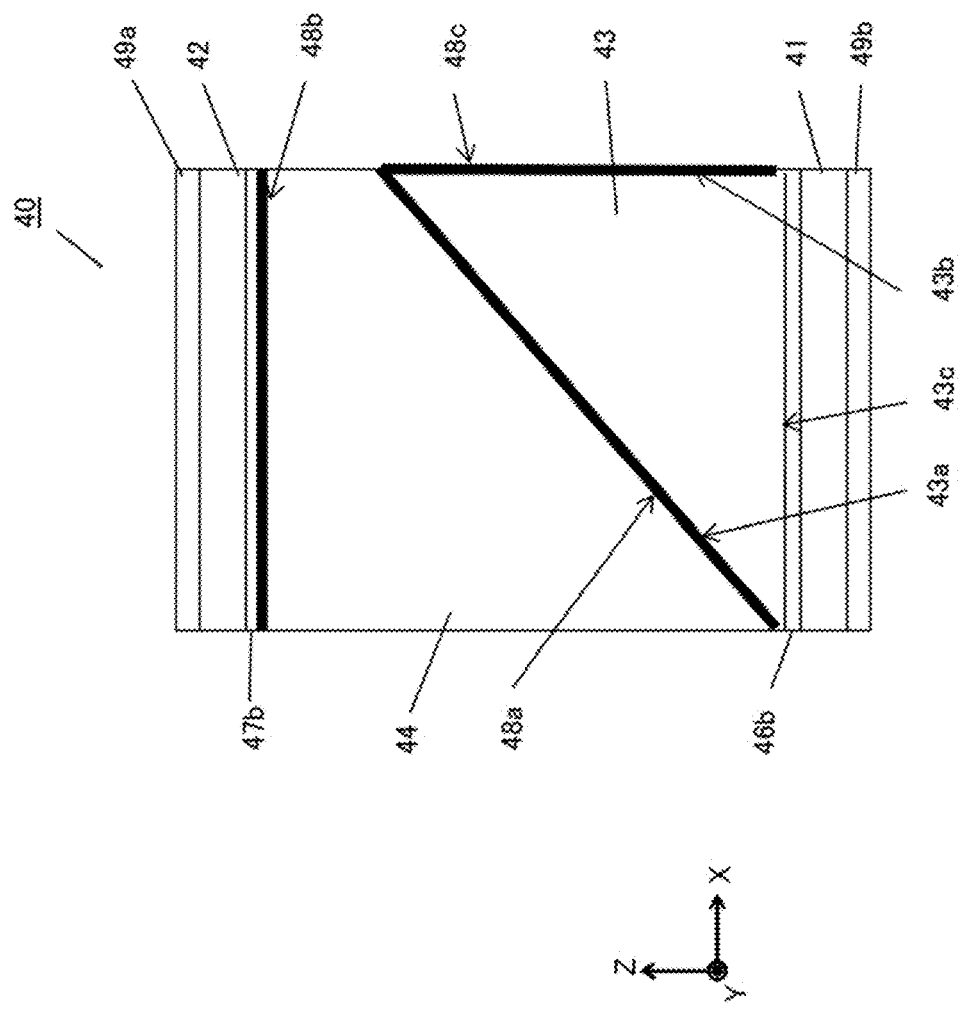
FIG. 5 is a schematic diagram showing the configuration of a liquid crystal prism element according to a comparative example.

FIG. 5 is a schematic diagram showing the configuration of a liquid crystal prism element according to a comparative example. In the comparative example, as shown in FIG. 5, the lenses 45 are not used. Light having light distribution as shown in FIG. 4 is incident on the liquid crystal prism element 40. In the graph of FIG. 4, light distribution of an image for right eye is shown by a solid line, and light distribution of an image for left eye is shown by a dashed line. These light distributions can be obtained by designing the light guide plate 23 and the light control film 30 so as to have appropriate shapes.

First, a case where the observer moves from a position in front of the center of the screen to the left edge side of the screen will be described with reference to FIG. 6. FIG. 6(a) is a schematic diagram showing a state where the observer is present at a position in front of the left edge of the image display apparatus. FIG. 6(b) is a diagram showing the refractive index distribution of the liquid crystal prism element according to the comparative example. FIG. 6(c) is a graph showing the intensity of light emitted from the liquid crystal prism element according to the comparative example.

As shown in FIG. 6(a), when the observer moves from a position in front of the center of the screen to the left edge side (the right edge side as seen from the observer) of the screen, no voltage (0 V) is applied to both the electrode 47b and the electrode 46b to set the refractive index of the liquid crystal layer 44 to 1.763 that is the refractive index of extraordinary light.

FIG. 6(b) shows the refractive index distribution in the case where no voltage is applied to both the electrode 47b and the electrode 46b. When no voltage is applied, the longitudinal axes of the liquid crystal molecules are uniformly oriented in the Y axis direction, and therefore, uniform refractive index distribution is obtained over the entire surface of the liquid crystal layer 44.

FIG. 6(c) shows the light distribution obtained after the light having the light distribution shown in FIG. 4 has passed through the liquid crystal prism element of the comparative example. In the following description, the sign on the horizontal axis of the graph of the light distribution is set such that the angle of light emitted toward ahead of the screen on the left with respect to a straight line orthogonal to the light exit surface of the liquid crystal prism element is positive. In addition, the value on the vertical axis represents the relative intensity of emitted light with respect to the intensity of light incident on the liquid crystal prism element.

When the angle of a point at which the light distribution for right eye and the light distribution for left eye intersect each other on the graph of FIG. 6(c) is defined as a scan angle α, the scan angle α is 0° in the light distribution characteristic shown in FIG. 4, while the scan angle α is −13.7° in FIG. 6(c). That is, the graph of FIG. 6(c) indicates that the liquid crystal prism element 40 of the comparative example has deflected the incident light by −13.7° toward the left side of the screen where the observer is present.

Next, a case where the observer moves from a position in front of the center of the screen to the right edge side of the screen will be described with reference to FIG. 7. FIG. 7(a) is a schematic diagram showing a state where the observer is present at a position in front of the right edge of the image display apparatus. FIG. 7(b) is a diagram showing the refractive index distribution of the liquid crystal prism element 40 according to the comparative example. FIG. 7(c) is a graph showing the intensity of light emitted from the liquid crystal prism element 40 according to the comparative example.

When the observer moves from a position in front of the center of the screen to the right edge side of the screen, no voltage (0V) is applied to the electrode 47b while a voltage by which the longitudinal axes of the liquid crystal molecules are sufficiently oriented in the Z direction is applied to the electrode 46b, whereby the refractive index of the liquid crystal layer 44 is set to 1.514 that is the refractive index of ordinary light.

FIG. 7(b) shows the refractive index distribution in the case where a voltage of 0 V is applied to the electrode 47b and a voltage of 20 V is applied to the electrode 46b. Although the orientation directions of the liquid crystal molecules in minute regions near the inclined surface 48a of the liquid crystal prism element 40, the wall surface 48c thereof, and the electrode 47b are not changed due to anchoring, substantially uniform refractive index distribution is obtained over the entire surface of the liquid crystal layer 44.

FIG. 7(c) shows the light distribution obtained after the light having the light distribution of FIG. 4 has passed through the liquid crystal prism element. While the scan angle α is 0° in the light distribution characteristic shown in FIG. 4, the scan angle α of the liquid crystal prism element of the comparative example is 11°. That is, the graph of FIG. 7(c) indicates that the liquid crystal prism element of the comparative example has deflected the incident light toward the right side of the screen where the observer is present.

Next, a case where the observer is present at a position in front of the center of the screen will be described with reference to FIG. 8. FIG. 8(a) is a schematic diagram showing a state where the observer is present at a position in front of the center of the image display apparatus 10. FIG. 8(b) is a diagram showing the refractive index distribution of the liquid crystal prism element according to the comparative example. FIG. 8(c) is a graph showing the intensity of light emitted from the liquid crystal prism element 40 according to the comparative example.

When the observer moves to a position in front of the center of the screen, no voltage (0 V) is applied to the electrode 47b while a voltage by which the longitudinal axes of the liquid crystal molecules are oriented in the Z direction to some extent is applied to the electrode 46b, whereby the refractive index of the liquid crystal layer 44 is set to 1.61 that is the same as the refractive index of the prism 43.

FIG. 8(b) shows the refractive index distribution obtained when a voltage of 0 V is applied to the electrode 47b and a voltage of 5 V is applied to the electrode 46b. The orientation directions of the liquid crystal molecules in minute regions near the inclined surface 43a of the prism 43, the wall surface 43b thereof, and the electrode 47b are not changed due to anchoring. In addition, the refractive index is gradually reduced and becomes to be 1.62 as the distance from the inclined surface 43a of the prism 43, the wall surface 43b thereof, and the electrode 47b increases. That is, the liquid crystal layer 44 has the refractive index distribution ranging from 1.763 to 1.62.

FIG. 8(c) shows the light distribution obtained after the light having the light distribution of FIG. 4 has passed through the liquid crystal prism. Also in FIG. 8(c), like in FIG. 4, the scan angle α is about −1.7°, which indicates that the incident light has been deflected to the center of the screen in front of which the observer is present. However, the peak intensity is reduced by about 70%. This is because, due to the refractive index distribution, the light that has entered the liquid crystal prism with directivity cannot maintain its distribution.

When such refractive index distribution is present in the same medium, the traveling speed of light is low in a part of the medium where the refractive index is relatively high, and high in a part of the medium where the refractive index is relatively low. That is, light is deflected from the part where the refractive index is low to the part where the refractive index is high.

The light deflected at the interface between the prism 43 and the liquid crystal layer 44 is further deflected due to the refractive index distribution of the liquid crystal layer 44. In the comparative example, as shown in FIG. 8(b), the refractive index gradually changes from the high refractive index to the low refractive index in directions perpendicular to the inclined surface 43a and the wall surface 43b, respectively. Therefore, the light traveling in the +Z direction is propagated in the liquid crystal layer 44 while being deflected in the +X direction in which the inclined surface is present or in the −X direction in which the wall surface is present. Therefore, light distribution characteristic having a reduced peak as shown in FIG. 8(c) is obtained.

Table 1 shows crosstalks and viewing position relative intensities at the center, left edge, and right edge of the screen.

TABLE 1

|  | Crosstalk (%) | | Peak intensity (%) | |
| --- | --- | --- | --- | --- |
|  | Left | Right | Left | Right |
| Center | 40.7 | 28.0 | 34.3 | 35.2 |
| Left edge | 10.6 | 10.7 | 66.5 | 78.0 |
| Right edge | 19.7 | 11.1 | 76.1 | 57.5 |

Left-eye crosstalk is a relative intensity of light for right eye, which reaches the observer's left eye, and right-eye crosstalk is the relative intensity of light for left eye, which reaches the observer's right eye. Specifically, the left-eye crosstalk is defined as a value of a relative intensity of light distribution for right eye at an angular position where the scan angle α is −6°, and the right-eye crosstalk is defined as a value of a relative intensity of light distribution for left eye at an angular position where the scan angle α is +6°. In addition, a left-eye viewing position relative intensity is a relative intensity of light for left eye, which reaches the observer's left eye, and a right-eye viewing position relative intensity is a relative intensity of light for right eye, which reaches the observer's right eye. Specifically, the left-eye viewing position relative intensity is defined as a value of a relative intensity of light distribution for left eye at the angular position where the scan angle α is −6°, and the right-eye viewing position relative intensity is defined as a value of a relative intensity of light distribution for right eye at the angular position where the scan angle α is +6°.

The lower the crosstalk value, the better. It is known that the crosstalk value being high causes a double-image (an image being seen doubly). In the comparative example, the crosstalk value is larger in the center of the screen than in the right-edge and left-edge positions. In addition, the value of the viewing position relative intensity is smaller in the center of the screen than in the right-edge and left-edge positions.

Example

The configuration of a liquid crystal prism element 40 according to Example will be described in detail with reference to FIG. 9. FIG. 9(a) is a schematic diagram showing a state where the observer is present at a position in front of the center of the image display apparatus. FIG. 9(b) is a diagram showing the refractive index distribution of the liquid crystal prism element 40 according to Example. FIG. 9(c) is a graph showing the light distribution of light emitted from the liquid crystal prism element 40 according to Example. Since Example is identical to the comparative example except that lenses 45 are provided, repeated description is not necessary.

As described above, in the liquid crystal prism element 40 according to the comparative example, when the observer is present at a position in front of the left edge or the right edge of the image display apparatus, sufficient light intensity for viewing can be ensured. However, when the observer is present at a position in front of the center of the image display apparatus, the light intensity is greatly reduced.

Therefore, the liquid crystal prism element 40 according to Example is configured so that sufficient viewing position relative intensity of light can be ensured even when the observer is present at a position in front of the center of the image display apparatus.

In the liquid crystal prism element 40 according to Example, the lens 45 is provided as shown in FIG. 3. The lens 45 is preferably formed of a material such as resin or glass. In Example, a resin having a refractive index of 1.5 is adopted. The light incident surface of the lens 45 is an aspheric surface, and the shape thereof is expressed by the following polynomial equation:

$$sagz(x) = ax + bx^2 + cx^3 + dx^4 + ex^5 + fx^6 + gx^7$$

In Example, the values of the respective coefficients are as follows: a=−0.16981, b=−28.238, c=5832.4, d=2.1055e+5, e=1.0383e+7, f=2.6613e+9, and g=5.9298e+11.

On the other hand, the light exit surface of the lens 45 is a plane surface, and is optically in contact with the electrodes 47a and 47b.

In Example, enlargement of the light distribution due to the refractive index distribution of the liquid crystal in the case where the observer is present in front of the center of the screen is suppressed by the refraction effect of the aspheric surface of the lens 45, thereby suppressing reduction in the viewing position relative intensity.

FIG. 9(c) shows the light distribution obtained after the light having the light distribution shown in FIG. 4 has passed through the liquid crystal prism element 40 of Example. In FIG. 9(c), the scan angle is −3.8°, which indicates that the incident light can be deflected to a position near the center of the screen in front of which the observer is present. In addition, enlargement of the light distribution is suppressed as compared to the light distribution at the center of the screen of the comparative example shown in FIG. 8(c), and thus the peak brightness is increased.

Table 2 shows crosstalks and viewing position relative intensities for right and left eyes at the center, left edge, and right edge of the screen according to Example.

TABLE 2

|  | Crosstalk (%) | | Peak intensity (%) | |
| --- | --- | --- | --- | --- |
|  | Left | Right | Left | Right |
| Center | 20.5 | 24.4 | 35.9 | 51.5 |
| Left edge | 17.1 | 20.9 | 53.9 | 58.8 |
| Right edge | 19.2 | 11.7 | 83.8 | 59.2 |

In Example, the value of the crosstalk in the center of the screen is smaller than that of the comparative example, and thus the crosstalk is improved. In addition, the value of the viewing position relative intensity is larger than that of the comparative example, and thus the viewing position relative intensity is improved. The crosstalk at the left edge of the screen is degraded as compared to that of the comparative example. However, the crosstalk at the left edge of the screen is suppressed to be slightly lower than the crosstalk in the center of the screen, and is within a practical range.

Other Embodiments

Figure 10:
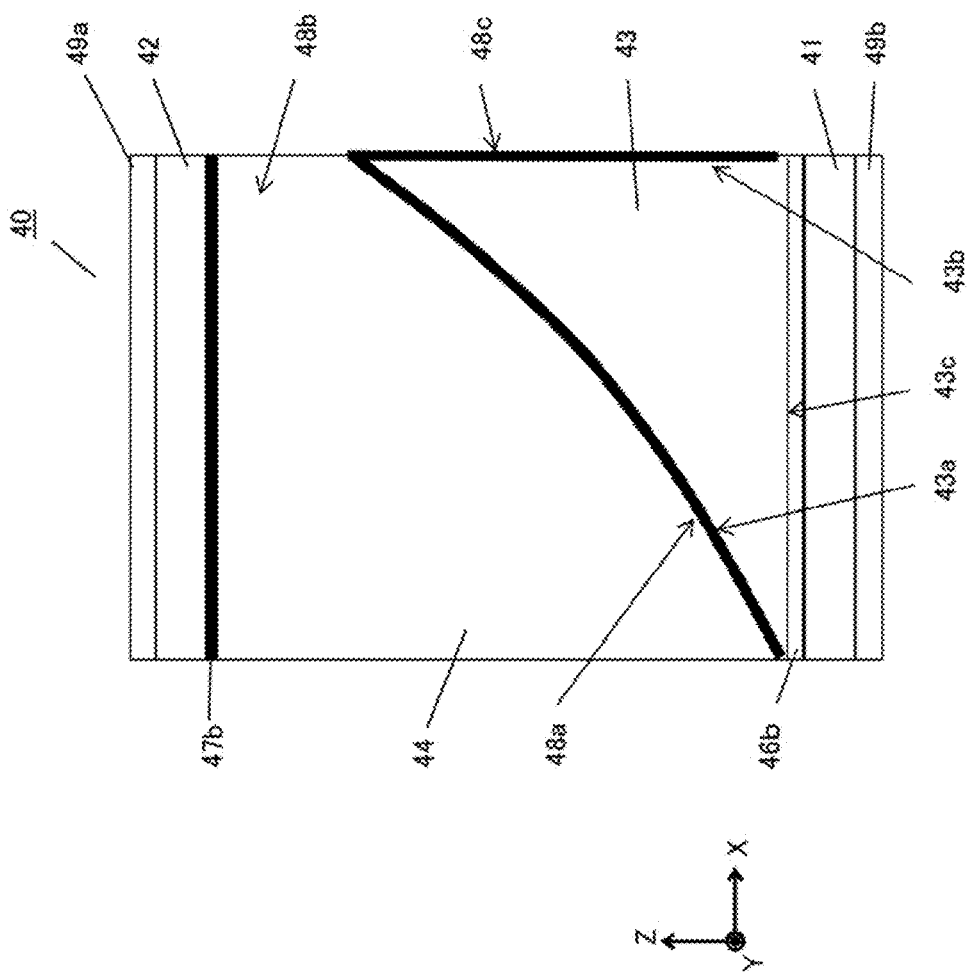
FIG. 10 is a partially enlarged view of a liquid crystal prism element according to another embodiment.
Figure 11:
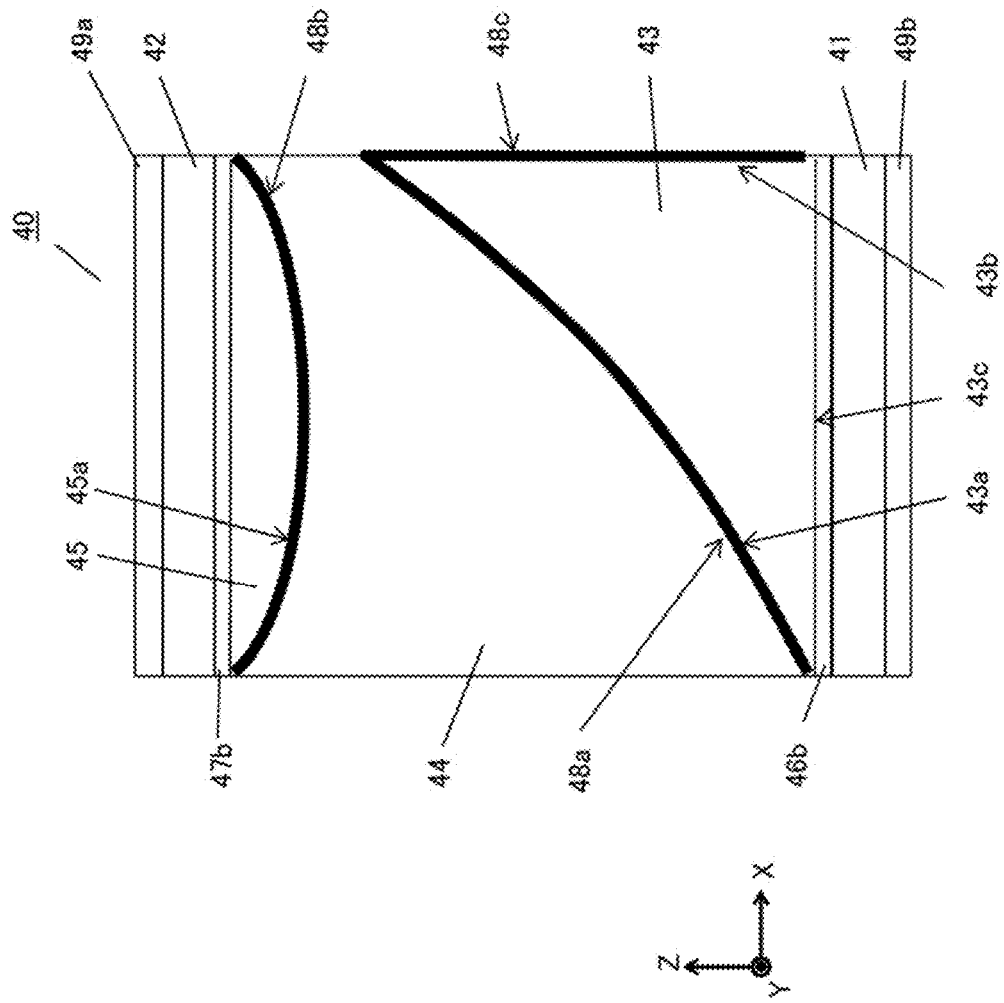
FIG. 11 is a partially enlarged view of a liquid crystal prism element according to still another embodiment.

FIGS. 10 and 11 show other embodiments of the present disclosure.

In the above embodiment, the crosstalk and the viewing position relative intensity in the center of the screen are improved by using the liquid crystal prism element 40 having the lenses 45 as shown FIG. 3. However, as shown in FIG. 10, the same effect as described above can be achieved, without using the lenses 45, by making the shape of the inclined surface 43a of each prism 43 aspheric. That is, the liquid crystal prism element 40 shown in FIG. 10 includes the prisms 43 as the first optical element and the liquid crystal layer 44 as the second optical element, and the inclined surface 43a of each prism 43 is an aspheric surface having an optical power in the X axis direction.

Further, the same effect as described above can also be achieved by using the lenses 45 and the prisms 43 each having the aspheric inclined surface 43a, as shown in FIG. 11. That is, the liquid crystal prism element 40 shown in FIG. 11 includes the prisms 43 constituting the first optical element, the liquid crystal layer 44 constituting the second optical element, and the lenses 45 constituting the third optical element. The inclined surface 43a of each prism 43 is an aspheric surface having an optical power in the X axis direction, and the incident surface 45a of each lens 45 is an aspheric surface having an optical power in the X axis direction.

As described above, since at least one of the interface between the first optical element and the second optical element and the interface between the second optical element and the third optical element is an aspheric surface, it is possible to compensate the angle of a light beam deviated from a desired deflection angle due to refractive index distribution. Using the light deflection element according to the present disclosure, it is possible to configure an image display apparatus in which reduction in the brightness of display light is suppressed.

The light deflection element according to the present disclosure deflects light so as to follow the position of an observer, and therefore, is effective for realizing high-brightness, high-efficiency, and high-resolution image display apparatuses. In addition, the light deflection element according to the present disclosure is widely applicable not only to use of displaying a three-dimensional image but also to use of displaying a two-dimensional image. Further, the light deflection element according to the present disclosure is applicable to a 3D liquid crystal display apparatus, a privacy display, and the like by a simple configuration.

What is claimed is:

1. An image display apparatus comprising:
an image display panel;
a backlight device disposed on a back surface side of the image display panel; and
a light deflection element disposed between the image display panel and the backlight device, wherein
the light deflection element comprises:
a first optical element configured to deflect incident light;
a second optical element configured to change a deflection direction of emitted light by changing a refractive index thereof according to a voltage applied thereto;
a third optical element disposed on an exit side of the second optical element; and
a control section configured to control the voltage applied to the second optical element,
at least one of an interface between the first optical element and the second optical element and an interface between the second optical element and the third optical element is an aspheric surface,
the aspheric surface has an optical power that compensates for enlargement of the emitted light which is caused by refractive index distribution caused when a voltage is applied to the second optical element,
the first optical element is located on a backlight device side and the third optical element is located on an image display panel side,
an image signal for a right eye and an image signal for a left eye to which a parallax is provided are alternately inputted into the image display panel in a time division manner, and
the backlight device comprises:
a light guide plate having a pair of side surfaces, and configured to guide light incident on the side surfaces to an exit surface;
a first light source located so as to face one of the side surfaces, and configured to emit illumination light for displaying an image for the right eye;
a second light source located so as to face another of the side surfaces, and configured to emit illumination light for displaying an image for the left eye; and
a light control sheet configured to deflect light emitted from the first light source and the second light source, toward a front of the image display apparatus and toward a center of the image display panel, wherein
the first light source and the second light source are alternately lit up in synchronization with switching between the image signal for the right eye and the image signal for the left eye.

* * * * *